US011088815B1

(12) United States Patent
Mishra et al.

(10) Patent No.: US 11,088,815 B1
(45) Date of Patent: Aug. 10, 2021

(54) TECHNIQUES FOR TIMED-TRIGGER AND INTERRUPT COEXISTENCE

(71) Applicant: QUALCOMM Incorporated, San Diego, CA (US)

(72) Inventors: Lalan Jee Mishra, San Diego, CA (US); Richard Dominic Wietfeldt, San Diego, CA (US); Umesh Srikantiah, San Diego, CA (US); Karthik Manivannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/062,118

(22) Filed: Oct. 2, 2020

(51) Int. Cl.
*H04L 7/00* (2006.01)
*H04B 7/212* (2006.01)
*H04W 24/10* (2009.01)

(52) U.S. Cl.
CPC ......... *H04L 7/0012* (2013.01); *H04B 7/2125* (2013.01); *H04L 7/0041* (2013.01); *H04L 7/0054* (2013.01); *H04W 24/10* (2013.01)

(58) Field of Classification Search
CPC ... H04L 7/0012; H04L 7/0041; H04L 7/0054; H04B 7/2125; H04W 24/10; G06F 13/364; G06F 13/362; G06F 13/4291; G06F 13/20; G06F 13/4282; H04J 3/0602
USPC ....... 375/356, 354, 219, 220, 222, 257, 258, 375/260, 295, 316
See application file for complete search history.

(56) References Cited

U.S. PATENT DOCUMENTS

| | | | |
|---|---|---|---|
| 2013/0019039 A1* | 1/2013 | Herklots | H04J 3/0602 710/105 |
| 2015/0100713 A1* | 4/2015 | Sengoku | G06F 13/364 710/110 |
| 2015/0199295 A1* | 7/2015 | Sengoku | G06F 13/364 710/110 |
| 2017/0083467 A1* | 3/2017 | Mishra | G06F 13/362 |
| 2018/0329856 A1* | 11/2018 | Mishra | G06F 13/20 |
| 2018/0329857 A1* | 11/2018 | Mishra | G06F 13/4282 |
| 2019/0042526 A1* | 2/2019 | Srivastava | G06F 13/364 |
| 2020/0133910 A1* | 4/2020 | Rodd | G06F 13/4291 |

* cited by examiner

*Primary Examiner* — Phuong Phu
(74) *Attorney, Agent, or Firm* — Patterson & Sheridan, LLP

(57) ABSTRACT

Certain aspects of the present disclosure provide an apparatus for wireless communication. The apparatus generally includes a plurality of slave radio frequency (RF) devices, a master RF device configured to set a configuration parameter in a register to be applied by an RF slave device of the plurality of RF slave devices, and a clock line coupled between the master RF device and the plurality of slave RF devices. The slave RF device may be configured to: count a number of cycles of a clock signal on the clock line; and apply the configuration parameter for the slave RF device based on the count of the number of cycles, wherein the master RF device is further configured to disable an interrupt reporting function of the plurality of slave RF device during a time period between setting the configuration parameter in the register and the configuration parameter being applied.

20 Claims, 9 Drawing Sheets

TECHNIQUES FOR TIMED-TRIGGER AND INTERRUPT COEXISTENCE

BACKGROUND

Field of the Disclosure

Certain aspects of the present disclosure generally relate to electronic components and, more particularly, radio frequency (RF) devices.

Description of Related Art

Electronic devices include computing devices such as desktop computers, notebook computers, tablet computers, smartphones, wearable devices like a smartwatch, internet servers, and so forth. These various electronic devices provide information, entertainment, social interaction, security, safety, productivity, transportation, manufacturing, and other services to human users. These various electronic devices depend on wireless communications for many of their functions. Wireless communication systems and devices are widely deployed to provide various types of communication content such as voice, video, packet data, messaging, broadcast, and so on. These systems may be capable of supporting communication with multiple users by sharing the available system resources (e.g., time, frequency, and power). Examples of such systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or a New Radio (NR) system).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure provide an apparatus for wireless communication. The apparatus generally includes: a plurality of slave radio frequency (RF) devices, a master RF device configured to set a configuration parameter in a register to be applied by an RF slave device of the plurality of RF slave devices, and a clock line coupled between the master RF device and the plurality of slave RF devices. The slave RF device may be configured to: count a number of cycles of a clock signal on the clock line; and apply the configuration parameter for the slave RF device based on the count of the number of cycles, wherein the master RF device is further configured to disable an interrupt reporting function of the plurality of slave RF device during a time period between setting the configuration parameter in the register and the configuration parameter being applied.

Certain aspects of the present disclosure provide a method for wireless communication. The method generally includes: setting, via a master RF device, a configuration parameter in a register to be applied for a slave RF device of a plurality of RF slave devices; counting, via the slave RF device, a number of cycles of a clock signal on a clock line coupled between the master RF device and the plurality of slave RF devices; applying, via the slave RF device, the configuration parameter for the slave RF device based on the count of the number of cycles; and disabling, via the master RF device, an interrupt reporting function of the plurality of slave RF devices during a time period between setting the configuration parameter in the register and the configuration parameter being applied.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure generally relate to techniques for coexistence of timed-trigger (TT) and interrupt functionality of master radio-frequency (RF) and slave RF devices. The master and slave RF devices may include RF front-end components to facilitate wireless communication. The TT functionality may be used to control configuration parameters of the slave devices, such as a gain value of an amplifier used for signal transmission. The TT functionality may use a clock line that is shared by the master and multiple slave RF devices. The same clock line may facilitate reporting of interrupts, which may cause conflicts between the TT and interrupt functions, as described in more detail herein. Certain aspects are directed to techniques for coexistence of the TT and interrupt functions.

Example Wireless Communications

Figure 1:
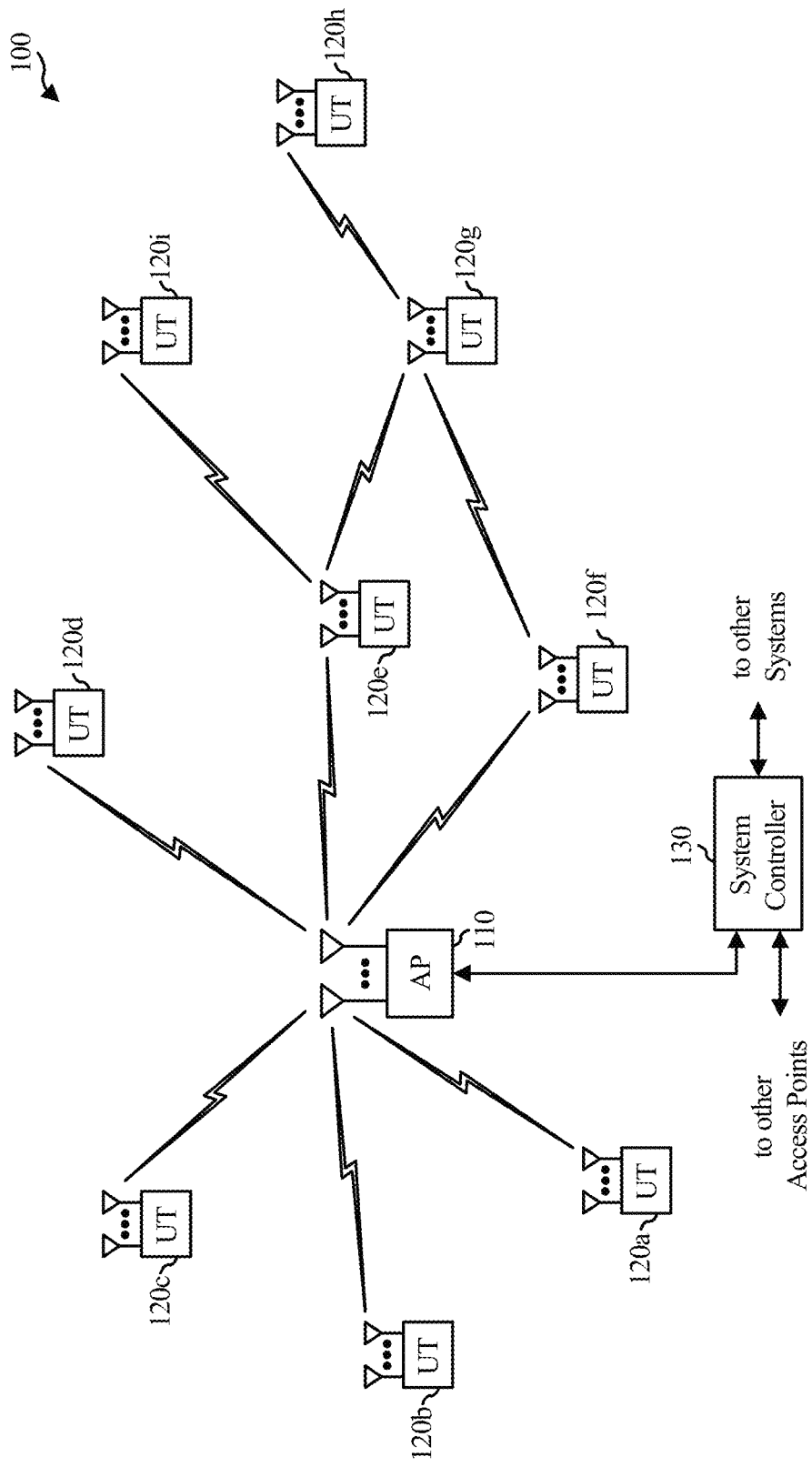
FIG. 1 is a diagram of an example wireless communications network, in accordance with certain aspects of the present disclosure.

FIG. 1 illustrates a wireless communications system 100 with access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

Wireless communications system 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless communications system 100 may be a time division duplex (TDD) system or a frequency division duplex (FDD) system. For a TDD system, the downlink and uplink share the same frequency band. For an FDD system, the downlink and uplink use different frequency bands. Wireless communications system 100 may also utilize a single carrier or multiple carriers for transmission. Each user terminal 120 may be equipped with a single antenna (e.g., to keep costs down) or multiple antennas (e.g., where the additional cost can be supported).

In some aspects, the user terminal 120 or access point 110 may include a radio-frequency (RF) system. The RF system may be configured to allow for coexistence of timed-trigger (TT) and interrupt functionality, as described in more detail herein.

Figure 2:
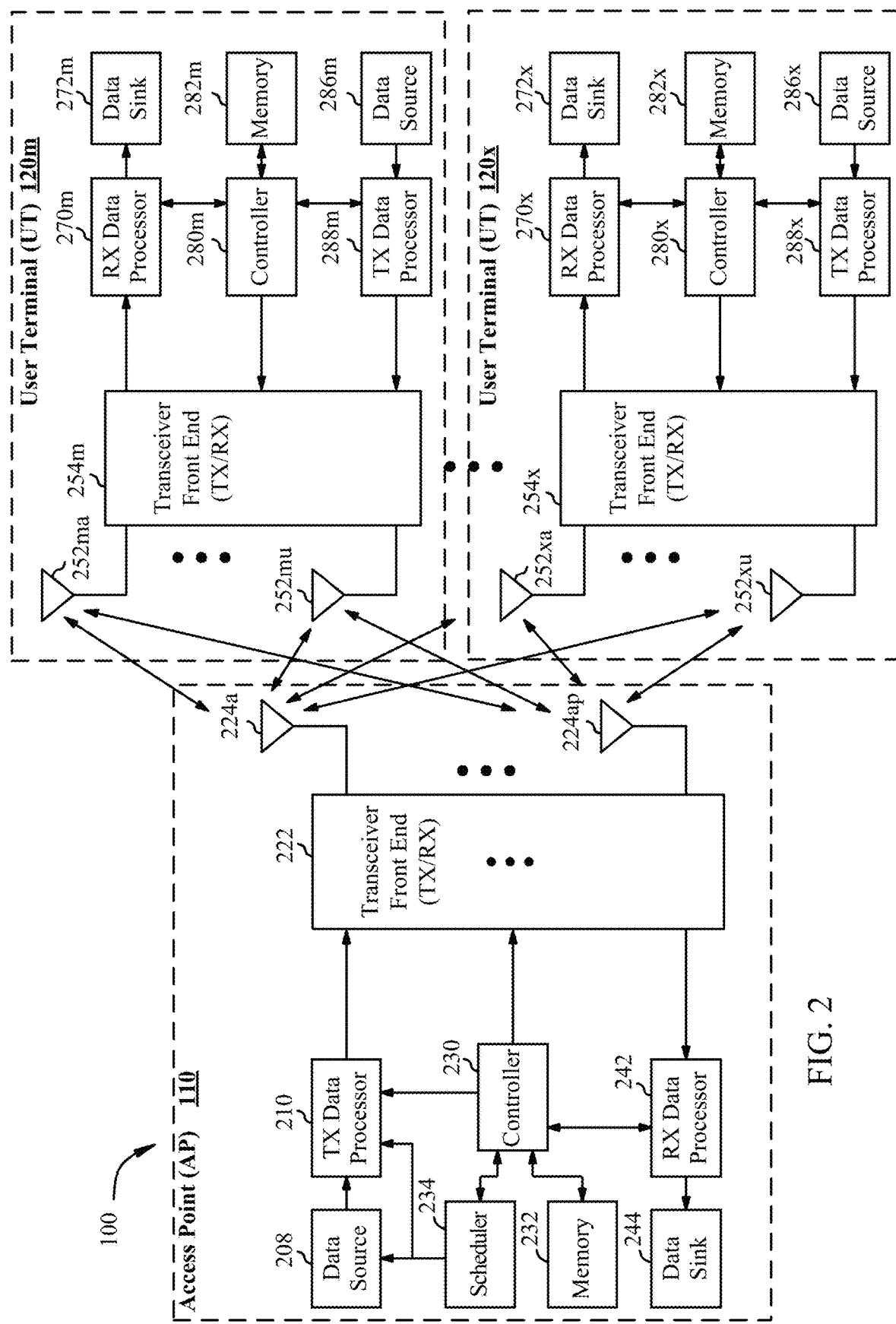
FIG. 2 is a block diagram of an example access point (AP) and example user terminals, in accordance with certain aspects of the present disclosure.

FIG. 2 shows a block diagram of access point 110 and two user terminals 120m and 120x in the wireless communications system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering, beamforming, or some other spatial processing technique may be used at the access point and/or user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one or more of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

In some aspects, the transceiver front end 254 or 222 may include a radio-frequency (RF) system. The RF system may be configured to allow for coexistence of timed-trigger (TT) and interrupt functionality, as described in more detail herein.

Figure 3:
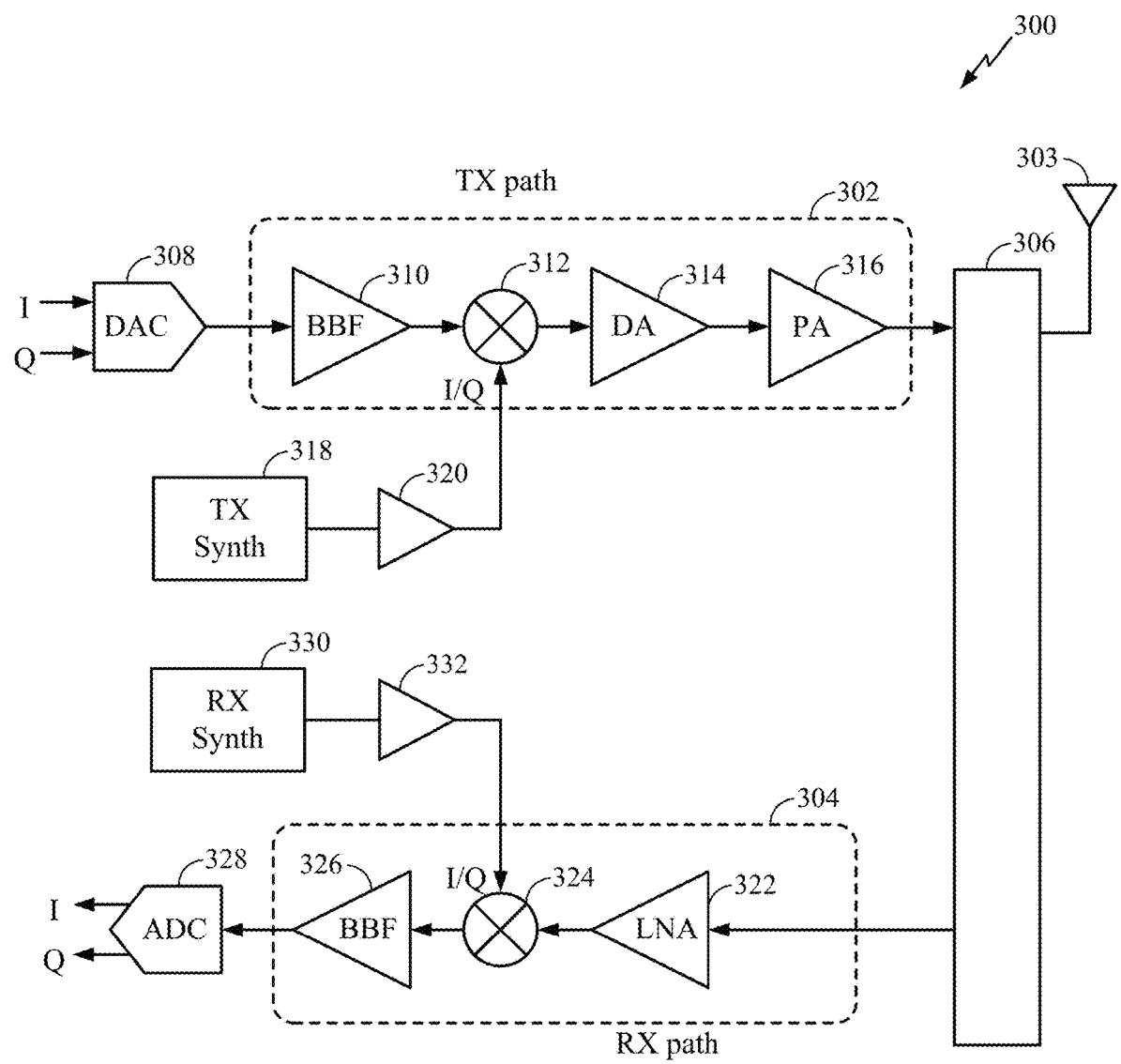
FIG. 3 is a block diagram of an example transceiver front end, in accordance with certain aspects of the present disclosure.

FIG. 3 is a block diagram of an example transceiver front end 300, such as transceiver front ends 222, 254 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be external to the RFIC.

The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning the LO to different frequencies typically entails using a variable-frequency oscillator, which may involve compromises between stability and tunability. Contemporary systems may employ frequency synthesizers with a voltage-controlled oscillator (VCO) to generate a stable, tunable LO with a particular tuning range. Thus, the transmit LO frequency may be produced by a TX frequency synthesizer 318, which may be buffered or amplified by amplifier 320 before being mixed with the baseband signals in the mixer 312. Similarly, the receive LO frequency may be produced by an RX frequency synthesizer 330, which may be buffered or amplified by amplifier 332 before being mixed with the RF signals in the mixer 324.

The transceiver front end 300 may be implemented in a master RF device and slave RF devices, forming an RF system. The RF system may be configured to allow for coexistence of timed-trigger (TT) and interrupt functionality, as described in more detail herein.

Example Techniques for Timed-Trigger and Interrupt Coexistence

Figure 4:
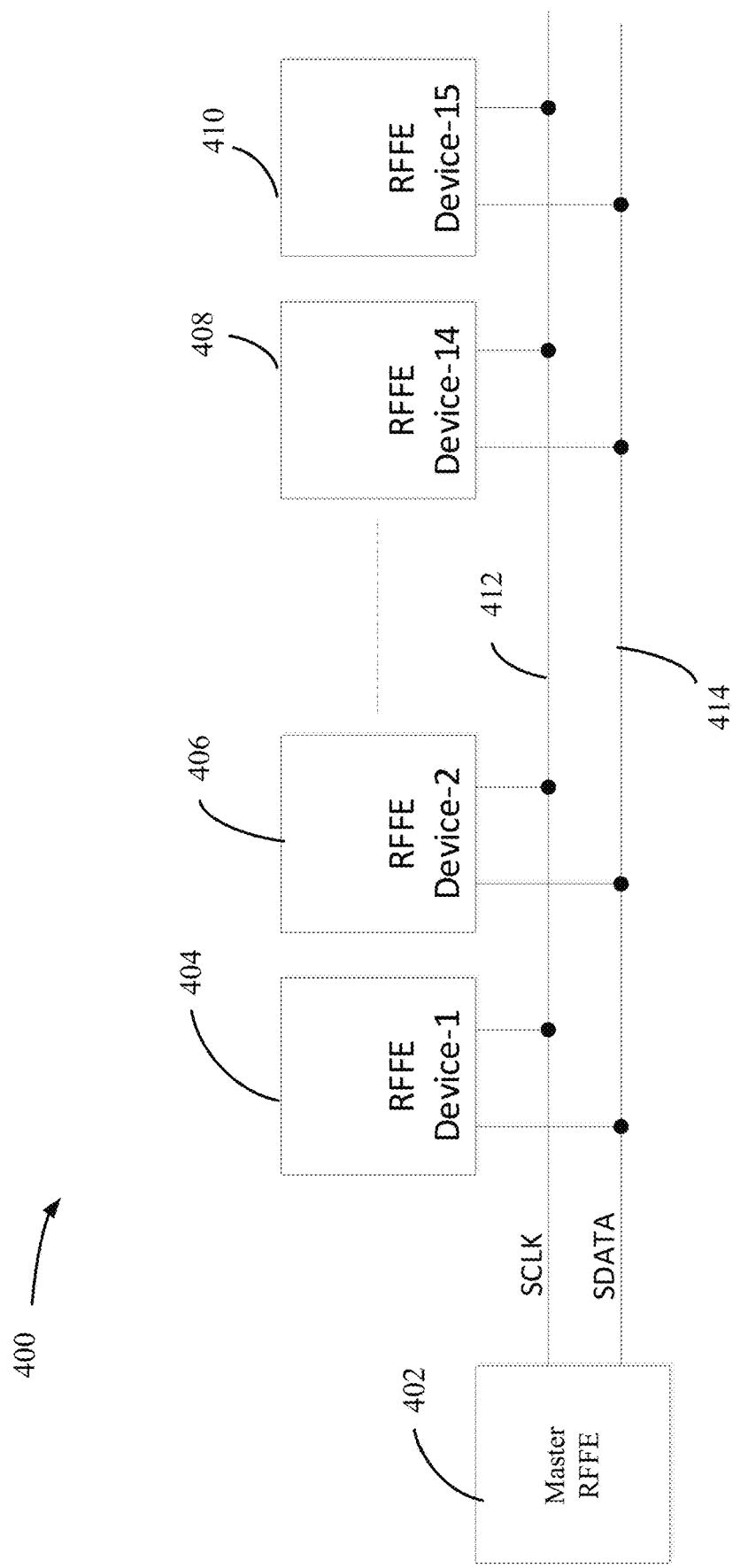
FIG. 4 illustrates a radio frequency (RF) system including master and slave RF devices, in accordance with certain aspects of the present disclosure.

FIG. 4 illustrates a radio frequency (RF) system 400 including master and slave RF devices, in accordance with certain aspects of the present disclosure. As illustrated, a master RF device 402 may be used to control multiple slave RF devices, such as slave RF devices 404, 406, 408, 410. Each of the master and slave devices may include RF front-end (RFFE) components to facilitate wireless communication, such as the components described with respect to FIG. 3. As illustrated, the RF system 400 may include a slave clock signal (SCLK) line 412 and a slave data signal (SDATA) line 414 between the master RF device 402 and the slave RF devices 404, 406, 408, 410.

In some cases, the RF system 400 may implement a RFFE timed-trigger (TT) feature using clocking of the SCLK line 412 for timing. For example, a configuration parameter such as a gain value for a power amplifier (PA) of slave RF device 404 may be stored (e.g., set) in a register of one of the slave RF devices, such as the slave RF device 404. This stored gain value may be activated after a configured time duration (e.g., number of clock cycles) has passed. For instance, when the new gain value is stored in the register of the slave device 404, a counter of the slave device 404 may be set to a digital value (e.g., also referred to as an "initial value") that may be decremented with each clock cycle of the SCLK line 412. Once the counter reaches a digital value of zero, the new gain value for the PA may take effect. The RFFE TT feature generally refers to the technique for activating a configuration parameter upon expiration of a timer, as described.

Conventionally, while the SCLK line is active for the TT feature, the SDATA line may be held to logic low using a weak drive by the master RF device 402. The master RF device 402 may expect that the SDATA line is not driven by any of the RFFE slave devices during this time.

The SDATA may be actively changing when the RFFE master device decides to launch a new datagram with the launch of a session start clock cycle (SSC) on the SCLK line 412. In this case, during the TT operation, an asynchronous-interrupt (AI) should not be launched by the RFFE slave device(s). AI operation involves the SCLK line clocking to set an interrupt-open and interrupt-close window, within which an interrupt ready RFFE slave device may drive the SDATA line 414 from logic low to logic high, indicating occurrence of an interrupt. Therefore, the AI operation may conflict with the TT operation as these operations use the same SDATA line 414. For example, the SDATA line 414 may be driven by a slave RF device to indicate an interrupt, resulting in an inadvertent SSC pulse.

In other words, during TT operation, the master RF device 402 may be allowed to drive the SDATA line to launch a new datagram, and in case of AI, the slave RF device(s) is/are allowed to drive the SDATA line to indicate interrupt. Thus, simultaneous operation of the TT and AI functions runs the risk of both the master and slave RF devices driving the SDATA line at the same time, in which case a valid interrupt may get masked from the master RF device's point of view and a following data session may lead to SDATA contention. That is, the master RF device 402 may assume that the master RF device is starting a new data session, and the slave RF device(s) may mistakenly assume that an interrupt has been identified by the master RF device and that arbitration and interrupt resolution phase is now in progress. Certain aspects of the present disclosure are generally directed to functionality that allows for coexistence of RFFE AI and TT functions.

Figure 5:
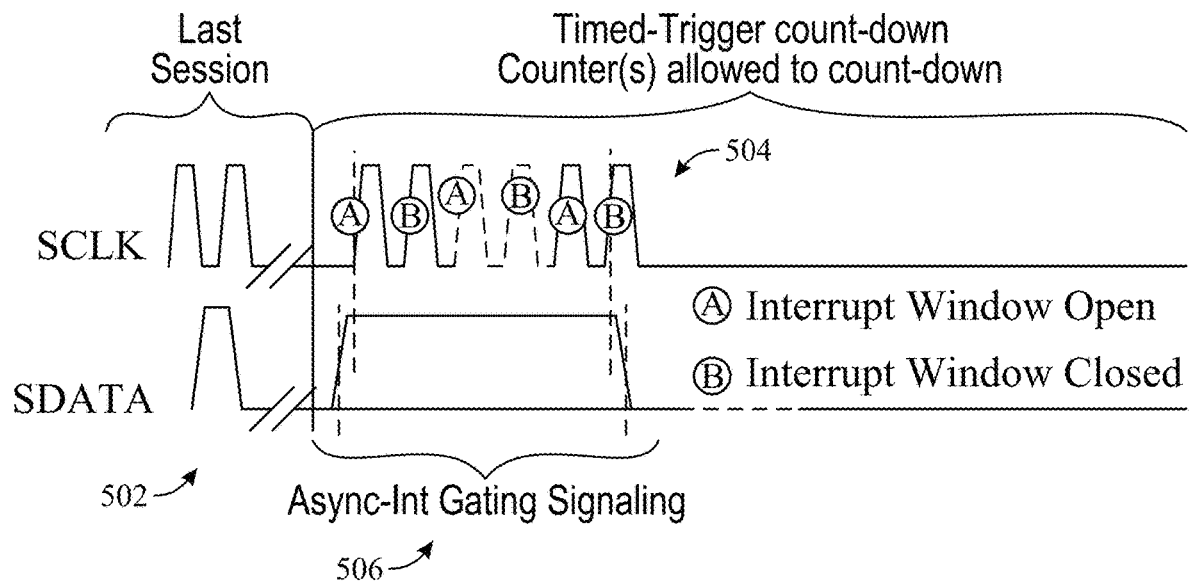
FIG. 5 is a timing diagram illustrating a clock signal on a clock line and a data signal on a data line, in accordance with certain aspects of the present disclosure.

FIG. 5 is a timing diagram illustrating a clock signal on the SCLK line 412 and a data signal on the SDATA line 414, in accordance with certain aspects of the present disclosure. During a data session 502, the master RF device 402 may launch a datagram to store a configuration parameter (e.g., a gain value for a PA) in a slave RF device such as the slave RF device 404. During a TT countdown session 506, the master RF device may drive the SCLK line such that multiple clock cycles 504 occur, facilitating a countdown to be performed by the slave RF device 404 for the TT function using a counter.

Figure 6:
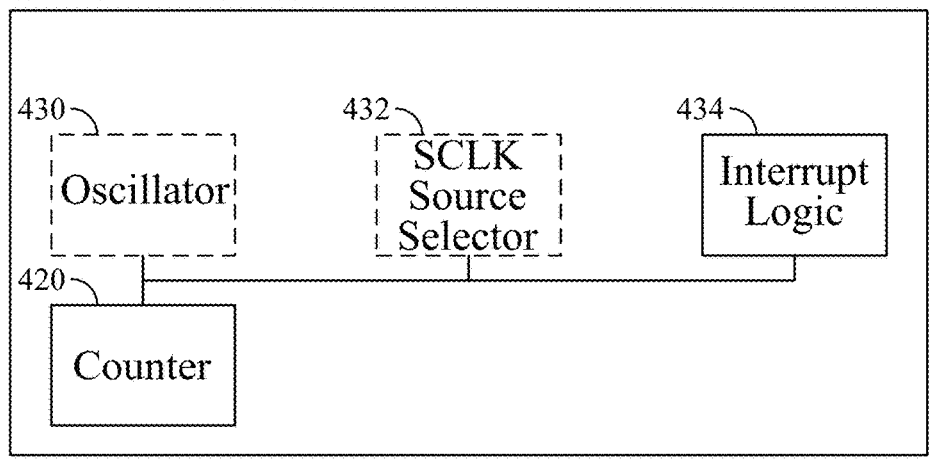
FIG. 6 illustrates an example implementation of a slave RF device, in accordance with certain aspects of the present disclosure.

FIG. 6 illustrates an example implementation of one of slave RF devices 404, 406, 408, 410, in accordance with certain aspects of the present disclosure. In certain aspects, each of the slave RF devices 404, 406, 408, 410 may include a counter 420. For example, the counter 420 of the slave RF device 404 may be decremented after each cycle of the clock signal for the TT function. When the counter reaches zero, the slave RF device 404 may apply the configuration parameter previously stored in a register of the slave RF device 404. For example, the configuration parameter may be a new gain value to be applied for a PA, and the slave RF device 404 may adjust the gain of a PA to the new gain value when the counter reaches zero.

Referring back to FIG. 5, an interrupt window may be opened at the rising edge of one clock cycle (labeled "A" in FIG. 6) during the TT countdown session 506, and closed at the rising of a subsequent clock cycle (labeled "B" in FIG. 6). While the interrupt window is open, any of the slave RF devices 404, 406, 408, 410 may initiate an interrupt, causing a conflict with the TT functionality, as described herein.

In certain aspects, interrupt-reporting functionality of the slave RF devices 404, 406, 408, 410 may be disabled during the TT countdown session 506, to prevent the interrupt functionality of the slave RF devices 404, 406, 408, 410 to conflict with the TT function. For example, the master device may disable interrupt-reporting functionality using hardware signaling (e.g., setting the SDATA line to logic high) or a register-configuration-based method. The register-configuration-based method may involve setting a register of at least one of the slave RF devices to disable interrupt reporting.

For the hardware signaling approach, the master RF device 402 may set the SDATA line 414 to logic high prior to the initial clock cycle during the TT countdown session, as illustrated. The slave RF devices may be configured to defer (e.g., gate) any interrupt that occurs until the SDATA line 414 is set back to logic low. In other words, the interrupt reporting functionality of the slave RF devices is disabled by setting the SDATA line 414 to logic high, and enabled by setting the SDATA line 414 back to logic low. While the interrupt remains gated on the slave RF devices, internal interrupt status may be saved in internal registers of the slave RF devices with an interrupt origination sequence marking, as described in more detail herein.

Figure 7:
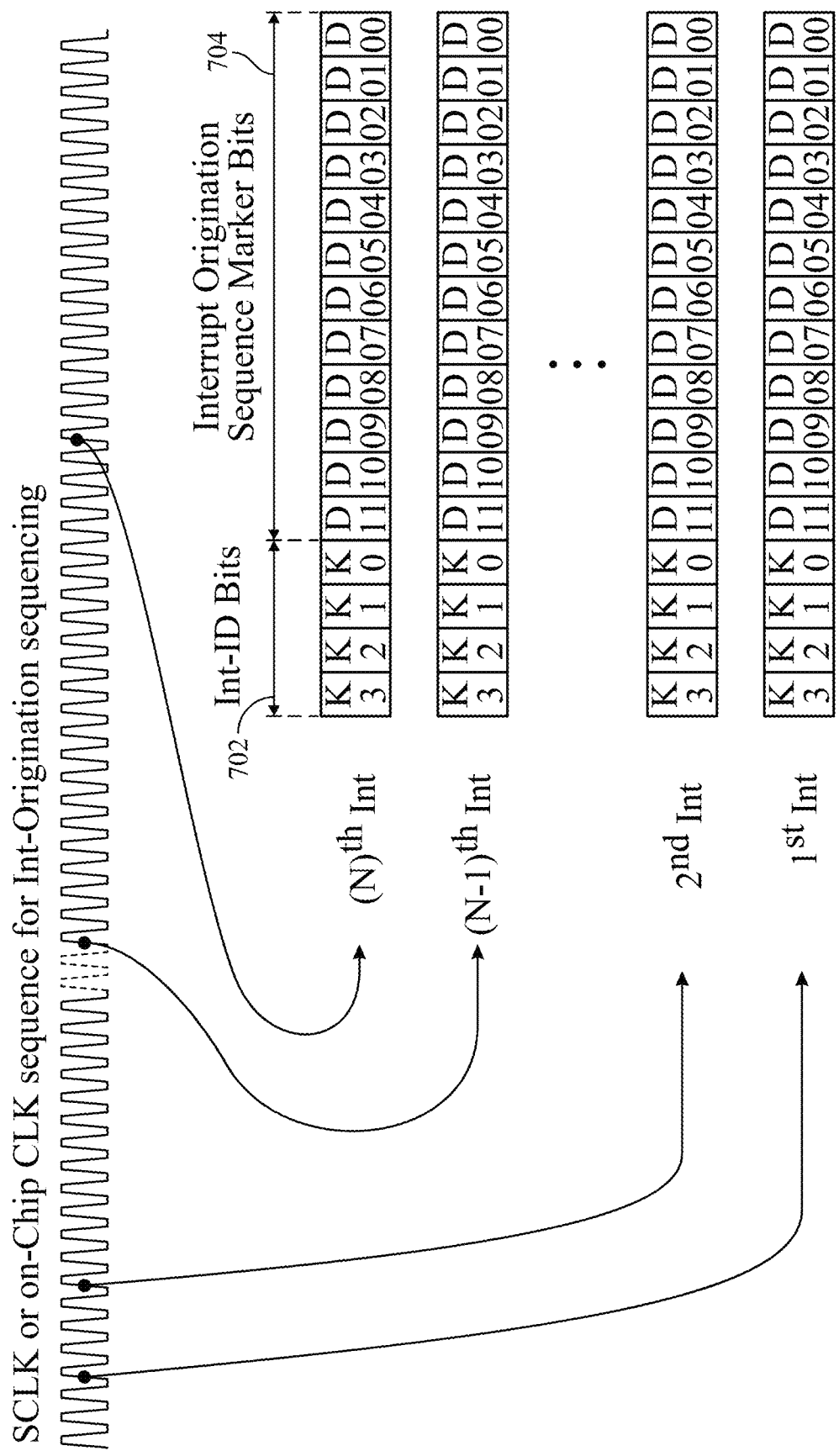
FIG. 7 illustrates example markings of an interrupt origination sequence, in accordance with certain aspects of the present disclosure.

FIG. 7 illustrates example markings of an interrupt origination sequence, in accordance with certain aspects of the present disclosure. As illustrated, while the interrupt functionality is disabled, a set of N interrupts may occur for a slave device, N being an integer equal to or greater than 1. The slave device may store an ID of the interrupt(s) along with their occurrence sequence such that no interrupt is lost or over-written while the interrupt reporting function remains gated. For instance, as illustrated in FIG. 7, 4 bits may be allocated for interrupt IDs 702 (labeled "Int-ID bits" in FIG. 7). Therefore, 16 different types of interrupts may be accommodated in this example. Greater than or less than 4 bits may be allocated for interrupt IDs in some implementations.

Moreover, an interrupt sequence marker bit-field 704 (e.g., being 12 bits wide) may also be used to track the order in which various interrupts have occurred. The interrupt sequence marker bit-field may be used to indicate the clock cycle at which the interrupt occurred. For instance, the interrupt sequence marker bit-field 704 may indicate that an interrupt (e.g., $1^{st}$ interrupt in FIG. 7) occurred at the fourth clock cycle. Using 12 bits for the interrupt sequence marker bit-field 704 accommodates a delay corresponding to up to $2^{12}$ clock cycles. However, a fewer or greater number of bits may be used for the interrupt sequence marker bit-field in some implementations. The interrupt origination sequence prevents loss or interrupt over-writing while interrupt reporting remains gated. By indicating the interrupt sequence to the master RF device, the master RF device may prioritize and process each interrupt according to its order of occurrence.

As illustrated in FIG. 6, one or more of the slave RF devices 404, 406, 408, 410 may include an oscillator 430 for generating a clock signal. In certain aspects, the slave RF devices may use the SCLK stream (e.g., of SCLK line 412) or on-chip clock source to mark an interrupt origination sequence. For example, each of the slave RF devices may include a clock selection module 432 for selecting between using the SCLK line 412 or the internal clock of the slave RF device. Moreover, each of the slave RF devices 404, 406, 408, 410 may include interrupt logic 434 for performing functionality associated with performing a clock cycle count for determining the interrupt original sequence count, and generation of the interrupt identification.

Figure 8:
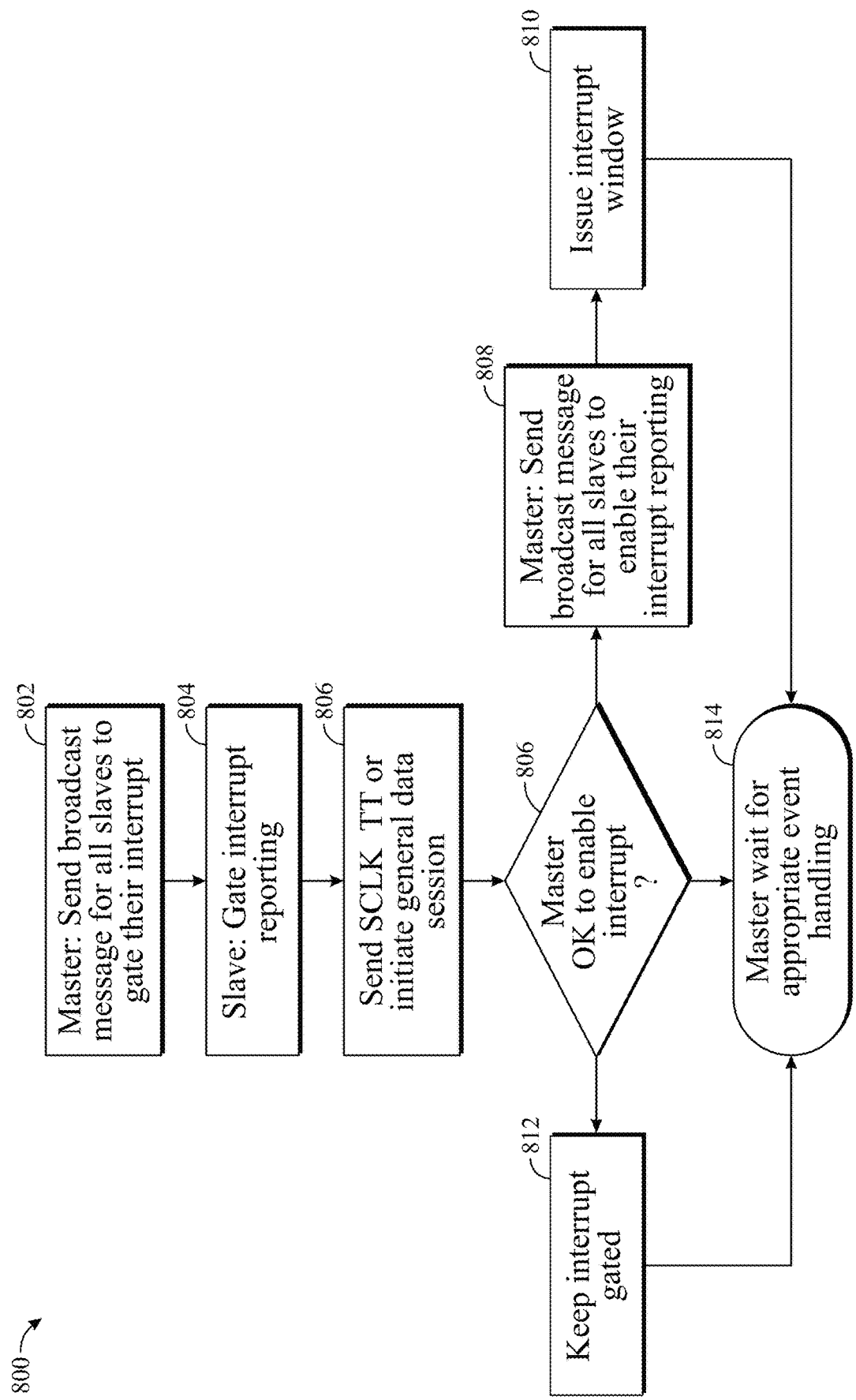
FIG. 8 illustrates example operations for timed-trigger and interrupt functionality, in accordance with certain aspects of the present disclosure.

FIG. 8 illustrates example operations 800 for TT and interrupt functionality, in accordance with certain aspects of the present disclosure. As illustrated, at block 802, a master device may send a broadcast message for all slaves to gate their interrupt. For instance, as described herein, the master RF device may set the SDATA line to logic high to disable interrupt functionality of the slave RF devices. At block 804, the slave devices may gate their interrupt reporting. In other words, no interrupt reporting may occur while the interrupt functionality is disabled even if a valid interrupt occurs during an interrupt reporting window. At block 806, the master RF device may then activate the SCLK for TT functionality or initiate a general datagram.

At block 808, the master RF device may decide whether to enable the interrupt functionality. If yes, then at block 808, the master device may send a broadcast message (e.g., set the SDATA line to logic low) for the slave RF devices to enable their interrupt reporting, and at block 810, issue an interrupt window, as described herein. If not, then at block 812, the master device may keep the interrupt gated. At block 814, the master device may wait for appropriate event handling (e.g., wait to perform other operations such as initiating a new data session).

Figure 9:
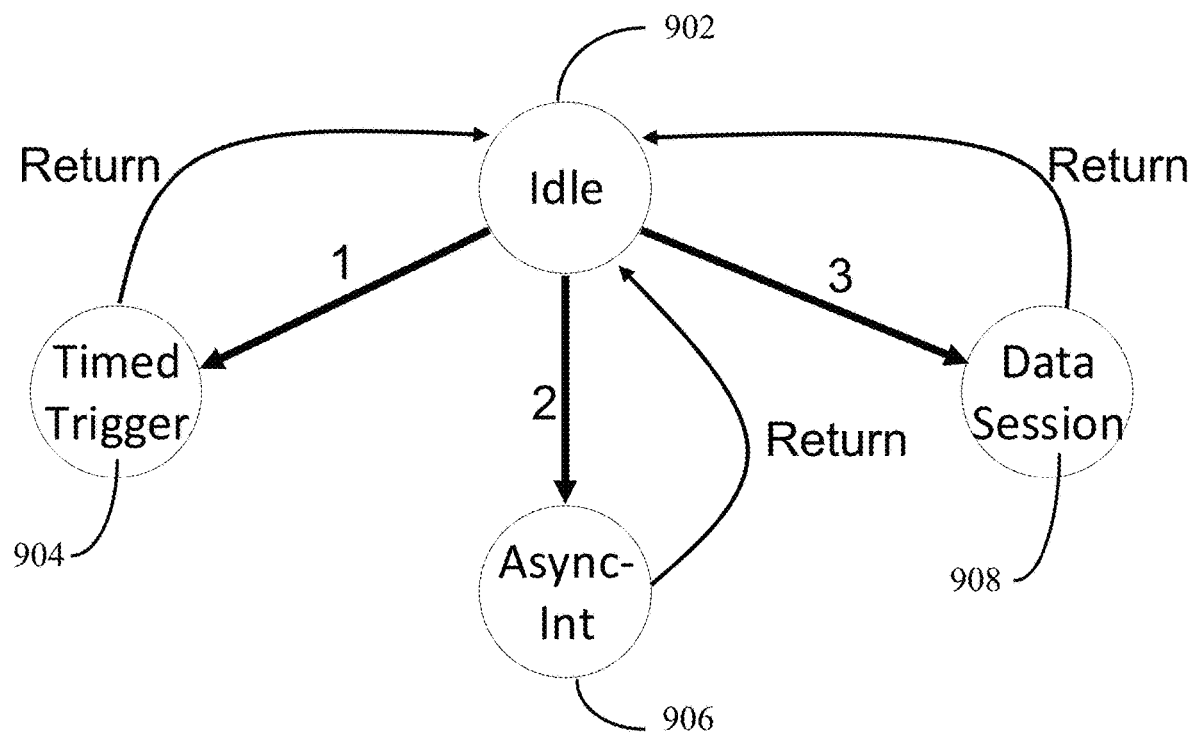
FIG. 9 is a state diagram illustrating state transitions of a master RF device, in accordance with certain aspects of the present disclosure.

FIG. 9 is a state diagram illustrating state transitions of the master RF device 402, in accordance with certain aspects of the present disclosure. As illustrated, the master RF device 402 may be in an idle state 902, and transition to a TT state 904. For example, the master RF device 402 may keep interrupt reporting gated using hardware signaling or register-configuration-based methods while TT operations are ongoing. The master RF device 402 may then return back to the idle state 902, and may begin an AI state 906. For example, the master device may clear any pending TT and launch an interrupt window for the slave devices to report interrupts, as described herein. The master RF device 402 may then return back to the idle state 902, and may begin a data session 908 with the launch of a SSC, as described herein. The master device may then return back to the idle state 902, as illustrated.

Figure 10:
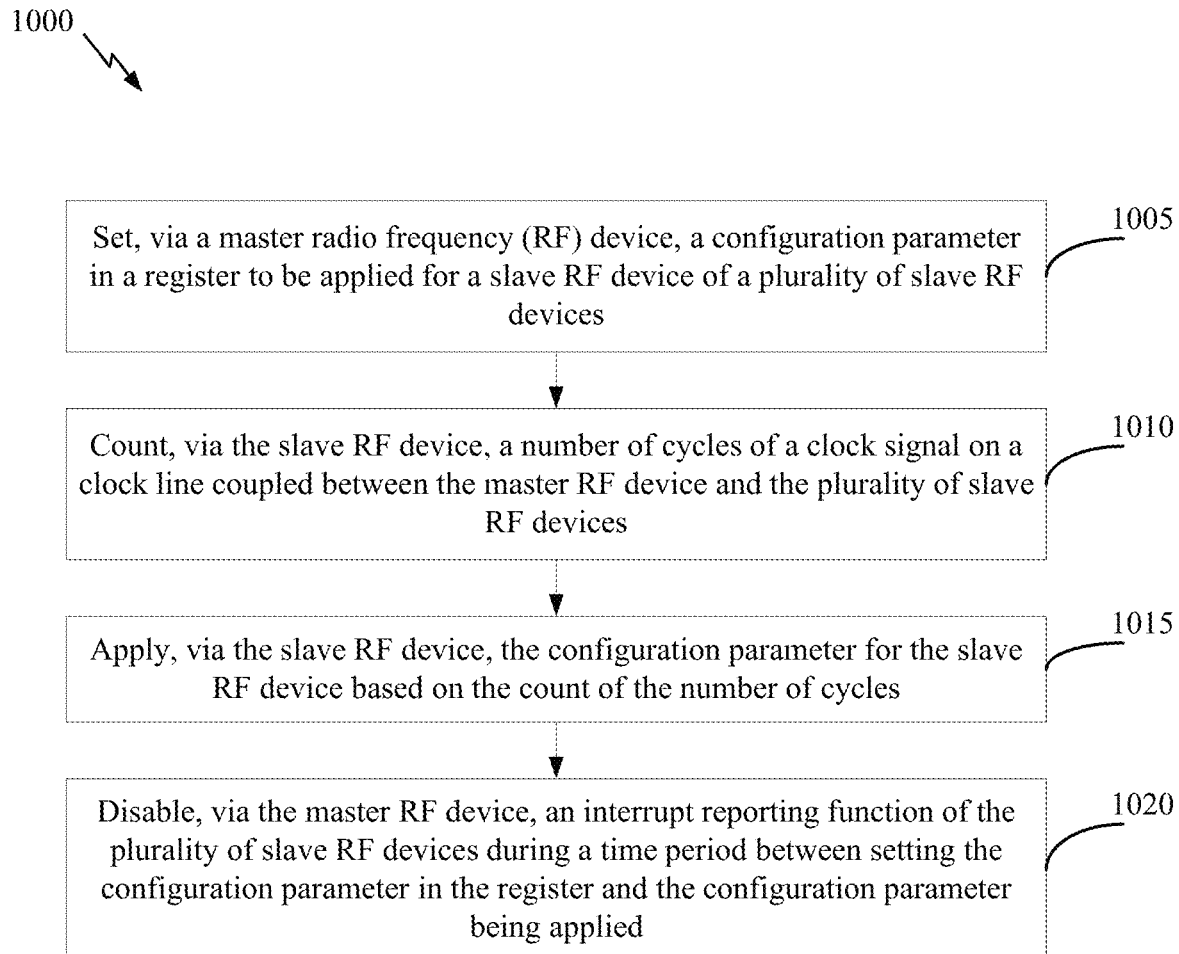
FIG. 10 is a flow diagram depicting example operations for wireless communication, in accordance with certain aspects of the present disclosure.

FIG. 10 is a flow diagram depicting example operations 1000 for wireless communication, in accordance with certain aspects of the present disclosure. For example, the operations 1000 may be performed by an RF system, such as the RF system 400.

The operations 1000 begin, at block 1005, with the RF system setting, via a master RF device (e.g., master RF device 402), a configuration parameter in a register (e.g., of a slave RF device) to be applied for a slave RF device (e.g., slave device 404) of a plurality of RF slave devices. At block 1010, the RF system counts, via the slave device, a number of cycles of a clock signal on a clock line (e.g., SCLK line 412) coupled between the master RF device and the plurality of slave RF devices. At block 1015, the RF system applies, via the slave RF device, the configuration parameter for the slave device based on the count of the number of cycles. In certain aspects of the present disclosure, the RF system may, at block 1020, disable, via the master device, an interrupt reporting function of the plurality of slave RF devices during a time period between setting the configuration parameter in the register and the configuration parameter being applied.

In certain aspects, disabling the interrupt reporting function may include transitioning a data line coupled between the master RF device and the slave RF device from a first logic state (e.g., logic low) to a second logic state (e.g., logic high). The interrupt reporting function may include indicating an interrupt to the master RF device by transitioning the data line from the first logic state to the second logic state via the slave RF device. In certain aspects, the RF system may initiate, via one or more of the plurality of slave RF devices, an interrupt during an interrupt window, the interrupt window beginning at a rising edge of a first cycle of the clock signal and ending at a rising edge of a subsequent cycle of the clock signal.

In some aspects, the RF system may enable, via the master RF device, the interrupt reporting function of the plurality of slave RF devices after the slave RF device is configured with the configuration parameter. The RF system may initiate, via one or more of the plurality of slave RF devices, one or more interrupts after the interrupt reporting function is enabled, each of the one or more interrupts being reported by indicating, to the master RF device, an identifier of the interrupt.

In some implementations, the one or more interrupts may include a plurality of interrupts that occur while the interrupt reporting function was disabled, and reporting each of the plurality of interrupts may include indicating an order of occurrence of the interrupt with respect to occurrence of the plurality of interrupts. For example, indicating the order of occurrence of the interrupt may include generating a sequence marker that indicates a clock cycle during which the interrupt occurred. In some cases, the RF system may select, via a clock selection module (e.g., clock selection module 432), one of clock signals generated by the slave RF device and the master RF device for the generation of the sequence marker.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B and object B touches object C, then objects A and C may still be considered coupled to one another—even if objects A and C do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits.

The apparatus and methods described in the detailed description are illustrated in the accompanying drawings by various blocks, modules, components, circuits, steps, processes, algorithms, etc. (collectively referred to as "elements"). These elements may be implemented using hardware, for example.

One or more of the components, steps, features, and/or functions illustrated herein may be rearranged and/or combined into a single component, step, feature, or function or embodied in several components, steps, or functions. Additional elements, components, steps, and/or functions may also be added without departing from features disclosed herein. The apparatus, devices, and/or components illustrated herein may be configured to perform one or more of the methods, features, or steps described herein.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover at least: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a plurality of slave radio frequency (RF) devices;
a master RF device configured to set a configuration parameter in a register to be applied by a slave RF device of the plurality of slave RF devices; and
a clock line coupled between the master RF device and the plurality of slave RF devices, wherein the slave RF device is configured to:
count a number of cycles of a clock signal on the clock line; and
apply the configuration parameter for the slave RF device based on the number of cycles, wherein the master RF device is further configured to disable an interrupt reporting function of the plurality of slave RF devices during a time period between setting the configuration parameter in the register and the configuration parameter being applied.

2. The apparatus of claim 1, further comprising a data line coupled between the master RF device and the slave RF device, wherein disabling the interrupt reporting function comprises transitioning the data line from a first logic state to a second logic state.

3. The apparatus of claim 2, wherein the interrupt reporting function comprises indicating an interrupt to the master RF device by transitioning the data line from the first logic state to the second logic state via the slave RF device.

4. The apparatus of claim 1, wherein each of the plurality of slave RF devices is configured to initiate an interrupt during an interrupt window, the interrupt window beginning at a rising edge of a first cycle of the clock signal and ending at a rising edge of a subsequent cycle of the clock signal.

5. The apparatus of claim 1, wherein the master RF device is further configured to enable the interrupt reporting function of the plurality of slave RF devices after the slave RF device is configured with the configuration parameter.

6. The apparatus of claim 5, wherein each of the plurality of slave RF devices is configured to initiate one or more interrupts after the interrupt reporting function is enabled, and wherein each of the one or more interrupts is reported by indicating, to the master RF device, an identifier of each interrupt.

7. The apparatus of claim 6, wherein the one or more interrupts comprise a plurality of interrupts that occurred while the interrupt reporting function was disabled, and wherein reporting each of the plurality of interrupts comprises indicating an order of occurrence of each interrupt with respect to occurrence of the plurality of interrupts.

8. The apparatus of claim 7, wherein indicating the order of occurrence of each interrupt comprises generating a sequence marker that indicates a clock cycle during which each interrupt occurred.

9. The apparatus of claim 8, further comprising a clock selection module configured to select one of clock signals generated by the slave RF device and the master RF device for the generation of the sequence marker.

10. The apparatus of claim 1, wherein disabling the interrupt reporting function comprises setting a register of each of the plurality of slave RF devices.

11. The apparatus of claim 1, wherein the slave RF device is further configured to set an initial value of a counter, and wherein counting the number of cycles of the clock signal comprises decrementing the counter in response to each cycle of the clock signal.

12. A method for wireless communication, comprising:
setting, via a master radio frequency (RF) device, a configuration parameter in a register to be applied for a slave RF device of a plurality of slave RF devices;
counting, via the slave RF device, a number of cycles of a clock signal on a clock line coupled between the master RF device and the plurality of slave RF devices;
applying, via the slave RF device, the configuration parameter for the slave RF device based on the number of cycles; and
disabling, via the master RF device, an interrupt reporting function of the plurality of slave RF devices during a time period between setting the configuration parameter in the register and applying the configuration parameter.

13. The method of claim 12, wherein disabling the interrupt reporting function comprises transitioning a data line coupled between the master RF device and the slave RF device from a first logic state to a second logic state.

14. The method of claim 13, wherein the interrupt reporting function comprises indicating an interrupt to the master RF device by transitioning the data line from the first logic state to the second logic state via the slave RF device.

15. The method of claim 12, further comprising initiating, via one or more of the plurality of slave RF devices, an interrupt during an interrupt window, the interrupt window beginning at a rising edge of a first cycle of the clock signal and ending at a rising edge of a subsequent cycle of the clock signal.

16. The method of claim 12, further comprising enabling, via the master RF device, the interrupt reporting function of the plurality of slave RF devices after the slave RF device is configured with the configuration parameter.

17. The method of claim 16, further comprising initiating, via one or more of the plurality of slave RF devices, one or more interrupts after the interrupt reporting function is enabled, wherein each of the one or more interrupts is reported by indicating, to the master RF device, an identifier of each interrupt.

18. The method of claim 17, wherein the one or more interrupts comprise a plurality of interrupts that occurred while the interrupt reporting function was disabled, and wherein reporting each of the plurality of interrupts comprising indicating an order of occurrence of each interrupt with respect to occurrence of the plurality of interrupts.

19. The method of claim 18, wherein indicating the order of occurrence of each interrupt comprises generating a sequence marker that indicates a clock cycle during which each interrupt occurred.

20. The method of claim 19, further comprising selecting, via a clock selection module, one of clock signals generated by the slave RF device and the master RF device for the generation of the sequence marker.

* * * * *